US007941934B2

(12) United States Patent
Gerner et al.

(10) Patent No.: US 7,941,934 B2

(45) Date of Patent: May 17, 2011

(54) METHOD FOR IDENTIFYING KEYS FOR CONTROLLING LOCKS

(75) Inventors: Nathan Gerner, Waukesha, WI (US); Paul Popowski, Lake Mills, WI (US); Jeff Zingsheim, Franklin, WI (US)

(73) Assignee: Honeywell International Inc., Morristown, NJ (US)

( * ) Notice: Subject to any disclaimer, the term of this patent is extended or adjusted under 35 U.S.C. 154(b) by 312 days.

(21) Appl. No.: 12/241,959

(22) Filed: Sep. 30, 2008

(65) Prior Publication Data

US 2010/0077809 A1 Apr. 1, 2010

(51) Int. Cl.
*G01B 1/00* (2006.01)

(52) U.S. Cl. ........................................ 33/540; 340/5.61

(58) Field of Classification Search ............ 33/539–540; 70/378, 394, 494; 340/5.1, 5.2, 5.6, 5.61, 340/5.64, 5.7

See application file for complete search history.

(56) References Cited

U.S. PATENT DOCUMENTS

| | | | | | |
|---|---|---|---|---|---|
| 3,500,326 | A | * | 3/1970 | Benford | 235/444 |
| 3,631,301 | A | * | 12/1971 | Goldman | 361/171 |
| 3,764,859 | A | * | 10/1973 | Wood et al. | 361/172 |
| 3,782,148 | A | * | 1/1974 | Goldman | 70/278.3 |
| 3,911,397 | A | * | 10/1975 | Freeny, Jr. | 340/5.25 |
| 4,050,063 | A | * | 9/1977 | Schull | 235/382 |
| 4,322,719 | A | * | 3/1982 | Moorhouse | 235/382 |
| 4,489,359 | A | * | 12/1984 | Suzuki | 361/172 |
| 4,591,852 | A | * | 5/1986 | Brod | 340/5.32 |
| 4,789,859 | A | * | 12/1988 | Clarkson et al. | 340/5.65 |
| 4,833,465 | A | * | 5/1989 | Abend et al. | 340/5.65 |
| 4,912,460 | A | * | 3/1990 | Chu | 340/5.67 |
| 4,931,789 | A | * | 6/1990 | Pinnow | 340/5.64 |
| 5,309,152 | A | * | 5/1994 | Krucoff | 340/5.67 |
| 5,691,711 | A | | 11/1997 | Jorgensen | |
| 5,771,722 | A | * | 6/1998 | DiVito et al. | 70/277 |
| 6,237,379 | B1 | * | 5/2001 | Hotzl | 70/279.1 |
| 6,382,007 | B1 | * | 5/2002 | Wright | 70/394 |
| 6,496,101 | B1 | * | 12/2002 | Stillwagon | 340/5.61 |
| 6,975,202 | B1 | * | 12/2005 | Rodriguez et al. | 340/5.25 |
| 2004/0051380 | A1 | * | 3/2004 | Okada | 307/10.5 |

(Continued)

FOREIGN PATENT DOCUMENTS

DE 40 12 408 A1 8/1991

(Continued)

OTHER PUBLICATIONS

"Master Lock® Bump Stop Security", website, (dated 2008).

(Continued)

*Primary Examiner* — G. Bradley Bennett
*Assistant Examiner* — Tania C Courson
(74) *Attorney, Agent, or Firm* — Husch Blackwell

(57) ABSTRACT

A system for controlling access to a secure area includes a lock and an electronic access device for controlling access to a secure area. The lock includes pins for locking and unlocking the lock. The access device communicates with the pins for electrically measuring movement of the pins. The access device stores an unlock pin code for the predetermined position of the pins for unlocking the lock. The electronic access device electrically measures pin movement by a key and determines a key code for the key from the pin movement. A control device electrically communicates with the electronic access device for identifying the key code and determining when the key code matches the unlock pin code.

16 Claims, 8 Drawing Sheets

U.S. PATENT DOCUMENTS

| | | | | |
|---|---|---|---|---|
| 2005/0144995 | A1* | 7/2005 | Russell et al. | 70/278.3 |
| 2009/0025435 | A1* | 1/2009 | Popowski | 70/91 |
| 2010/0139340 | A1* | 6/2010 | Gerner | 70/263 |
| 2010/0148918 | A1* | 6/2010 | Gerner et al. | 340/5.2 |

FOREIGN PATENT DOCUMENTS

| | | | |
|---|---|---|---|
| DE | 44 39 744 | A1 | 4/1995 |

OTHER PUBLICATIONS

European Search Report corresponding to Application No. EP 09 17 1150, dated Jan. 19, 2010.

English translation of abstract of DE 4012408 (A1).

English translation of abstract of DE 4439744 (A1).

* cited by examiner

METHOD FOR IDENTIFYING KEYS FOR CONTROLLING LOCKS

FIELD OF THE INVENTION

The present invention relates to access control systems, and more particularly, relates to access control systems having both mechanical security and electronic access control.

BACKGROUND OF THE INVENTION

Current access control systems may electronically monitor and control access at an entryway to a secure area using, for example, a reader for reading an access card. Additionally, however, the secure area controlled by the access control system may include one or more entryways having a mechanical lock. For example, doors may have both mechanical security, e.g., a lock, and electronic access control, in this case, the mechanical lock mechanism takes precedence over the access control logic. Additionally, the doors having a lock may be opened by unlocking the lock using a typical door key, or alternatively a master key which overrides the access control system. Alternative access control systems and security systems may include electronically activated mechanical locks. Such control systems may also include multiple entryways, for example, on a floor of a building or the entire building, for example, as shown in commonly-owned, and co-pending U.S. patent application Ser. No. (11/782,557), the entire contents and disclosure of which is expressly incorporated by reference herein in its entirety.

A shortcoming of such systems is that the access control system is not able to monitor when the door is opened by a key. Further, the access control system is not able to identify who is passing through the doorway. If the system has a door position switch, the access control system will have only a record of the door opening, but not an identity and record of the key which opened the lock mechanically. In an access control system which has a door position switch, the door opening event will appear as a forced entry. Another shortcoming of such systems is that a person who is authorized to enter and uses the key entry, either a typical key or a master key, will trigger the forced entry alarm. The system does not have the ability to authenticate and identify the access using one or more keys. This situation is disadvantageous since the accuracy of the access control system is compromised due to the unidentified entry.

It would therefore be desirable to provide a method and access control system utilizing the method for identifying a key used in a door lock. It would further be desirable for the method and access control system to determine if action is required based on the key identification. It would also be desirable for the method and access control system to identify the key and electronically allow access to a secure area by remotely opening a door based on the key identification.

SUMMARY OF THE INVENTION

A system for controlling access to a secure area including a lock having a locked and unlocked position for controlling access to a secure area. The lock includes pins for locking and unlocking the lock, and the pins include a predetermined position for unlocking the lock. An electronic access device communicates with the pins for electrically measuring movement of the pins and determining an unlock pin code for the predetermined position of the pins for unlocking the lock. The electronic access device electrically measures pin movement by a key and determines a key code for the key from the pin movement. A control device electrically communicates with the electronic access device, and the control device identifies the key code and determines when the key code matches the unlock pin code.

In a related aspect, the control device controls access to the secure area using an access interface proximal to the lock. The control device may control access to the secure area using at least one governing pin in the lock. The control device allows access using the governing pin when the key code matches the unlock pin code and denies access using the governing pin when the key code does not match the unlock pin code. The pins may each include shear points aligning with a cylinder shear line for unlocking the lock when the key code matches the unlock pin code.

In a related aspect, the pins are a first set of pins and the system further includes a second set of pins in the lock. Each pin of the second set of pins includes a shear point aligning with a cylinder shear line. An actuator in the lock communicates with the second set of pins, and the actuator is controlled by the control device for moving the second set of pins to align with the shear line for unlocking the lock when the key code matches the unlock pin code. In another embodiment, multiple pin codes allow respective multiple key codes from respective keys to allow access using the control device. The pin movement may be measured by a resistance measurement of a spring biasing the pin towards a key insertion passageway in the lock. The pin movement may be measured by a tension measurement of a spring biasing the pin towards a key insertion passageway in the lock. The pin movement may be measured using capacitance. The capacitance may be measured by sensing increased capacitance when the pin is pushed into a cylinder in the lock by the key. In another embodiment, the pin movement may be measured using inductance. The inductance my be measured by measuring the length of a spring biasing the pin towards a key insertion passageway in the lock.

In a related aspect, the control device determines a security event by determining when the key code matches the unlock pin code. The control device may also generate a signal when the key code does not match the unlock pin code.

In another aspect of the invention, a method for controlling access to a secure area comprises: controlling access to a secure area using a lock having a locked and unlocked position, the lock including pins for locking and unlocking the lock, the pins including a predetermined position for unlocking the lock; electrically measuring movement of the pins using an electronic access device communicating with the pin; determining an unlock pin code for the predetermined position of the pins for unlocking the lock; measuring pin movement by a key using the electronic access device; determining a key code for the key from the pin movement; identifying the key code using a control device electrically communicating with the electronic access device; and determining when the key code matches the unlock pin code for authenticating the key using the control device.

In another aspect of the invention, a computer program product comprises a computer readable medium having recorded thereon a computer program for enabling a processor in a computer system to control access to a secure area, the computer program performing the steps of controlling access to a secure area using a lock having a locked and unlocked position, the lock including pins for locking and unlocking the lock, the pins including a predetermined position for unlocking the lock; electrically measuring movement of the pins using an electronic access device communicating with the pin; determining an unlock pin code for the predetermined position of the pins for unlocking the lock; measuring pin movement by a key using the electronic access device; determining a key code for the key from the pin movement; identifying the key code using a control device electrically communicating with the electronic access device; and determining when the key code matches the unlock pin code for authenticating the key using the control device.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
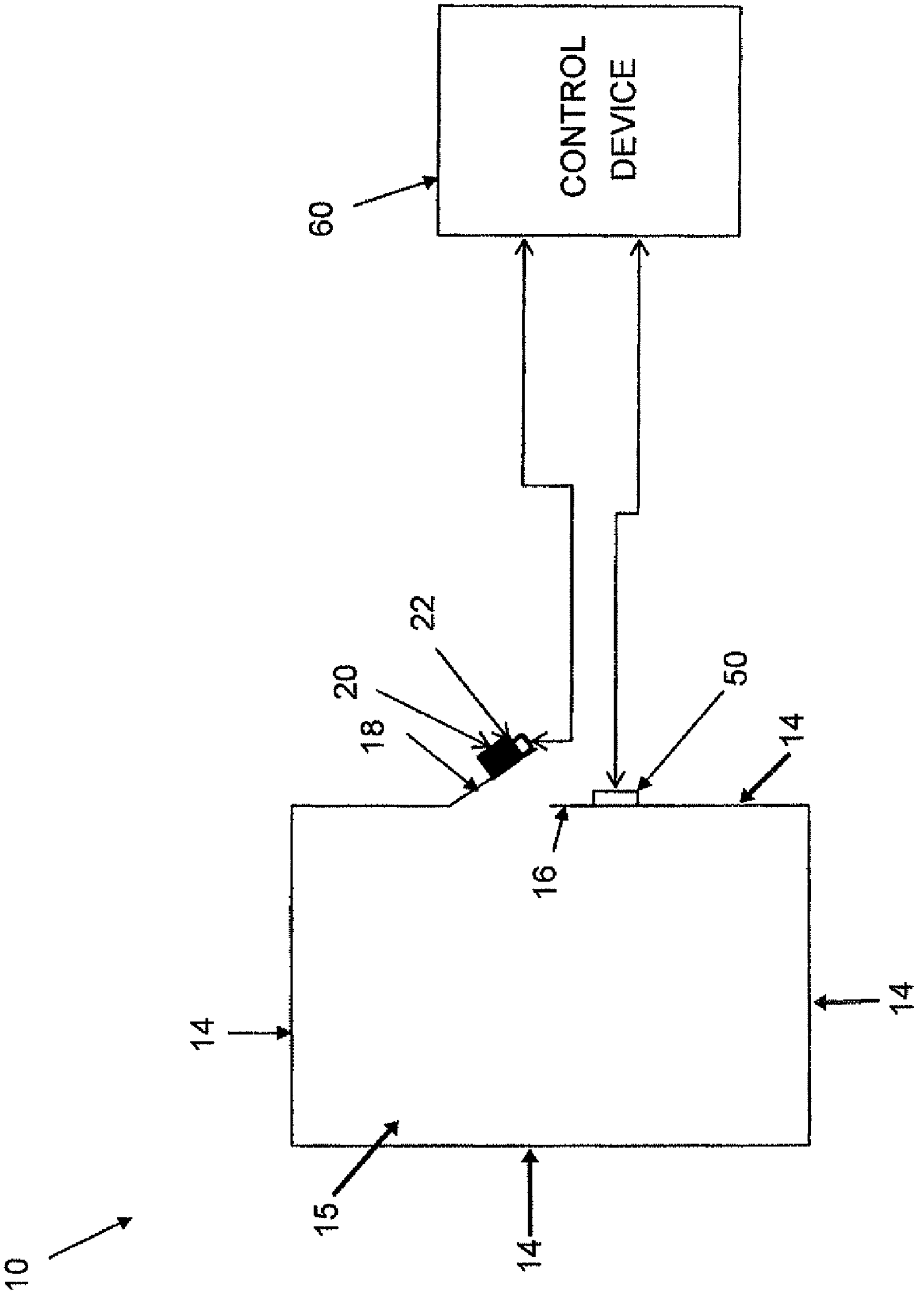
FIG. 1 is a block diagram of a system for controlling access to a secure area according to an embodiment of the invention.
Figure 2:
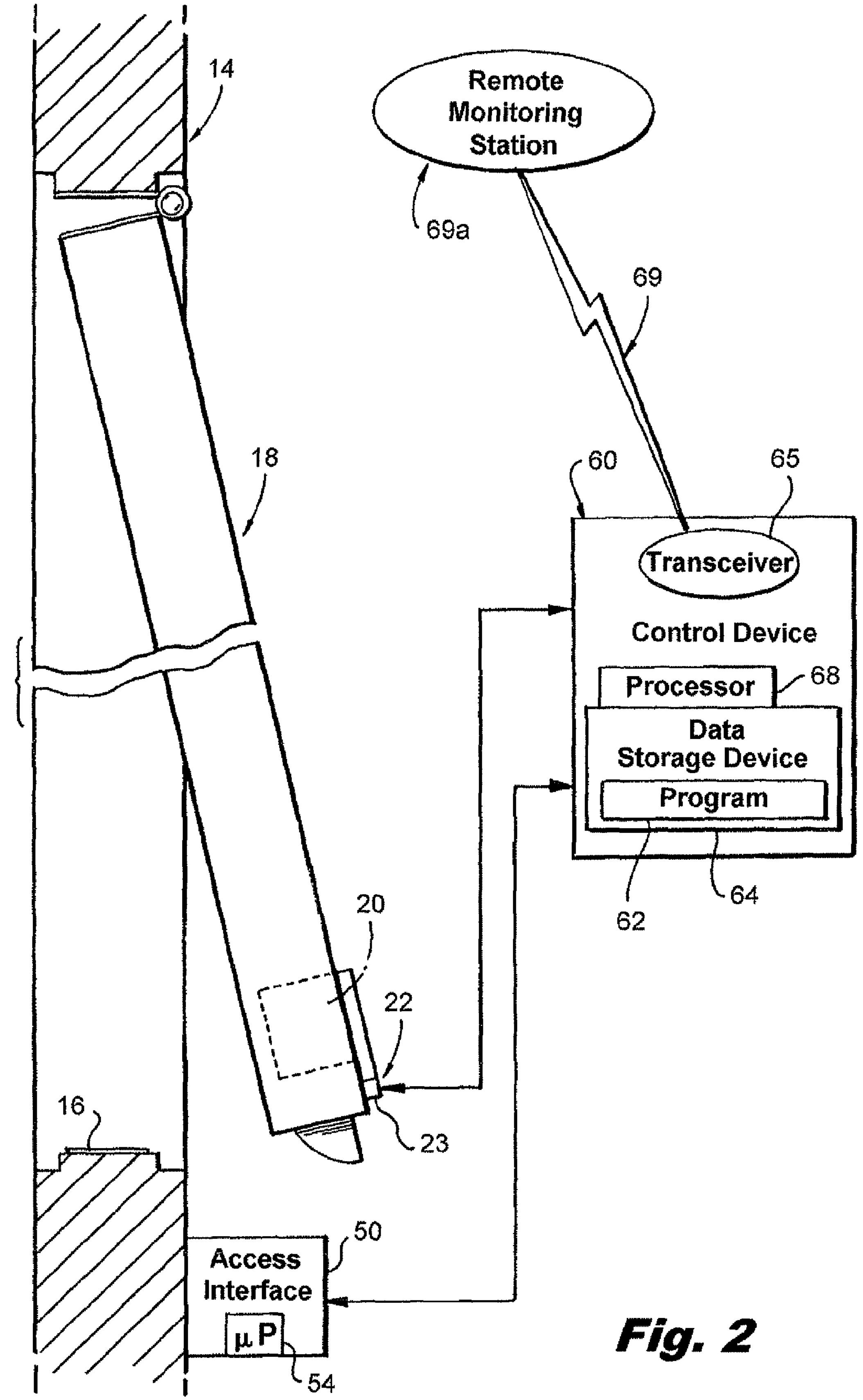
FIG. 2 is side elevational view of a door strike, door, access device, and access interface and a detail block diagram of a control device, of the system shown in FIG. 1.
Figure 3:
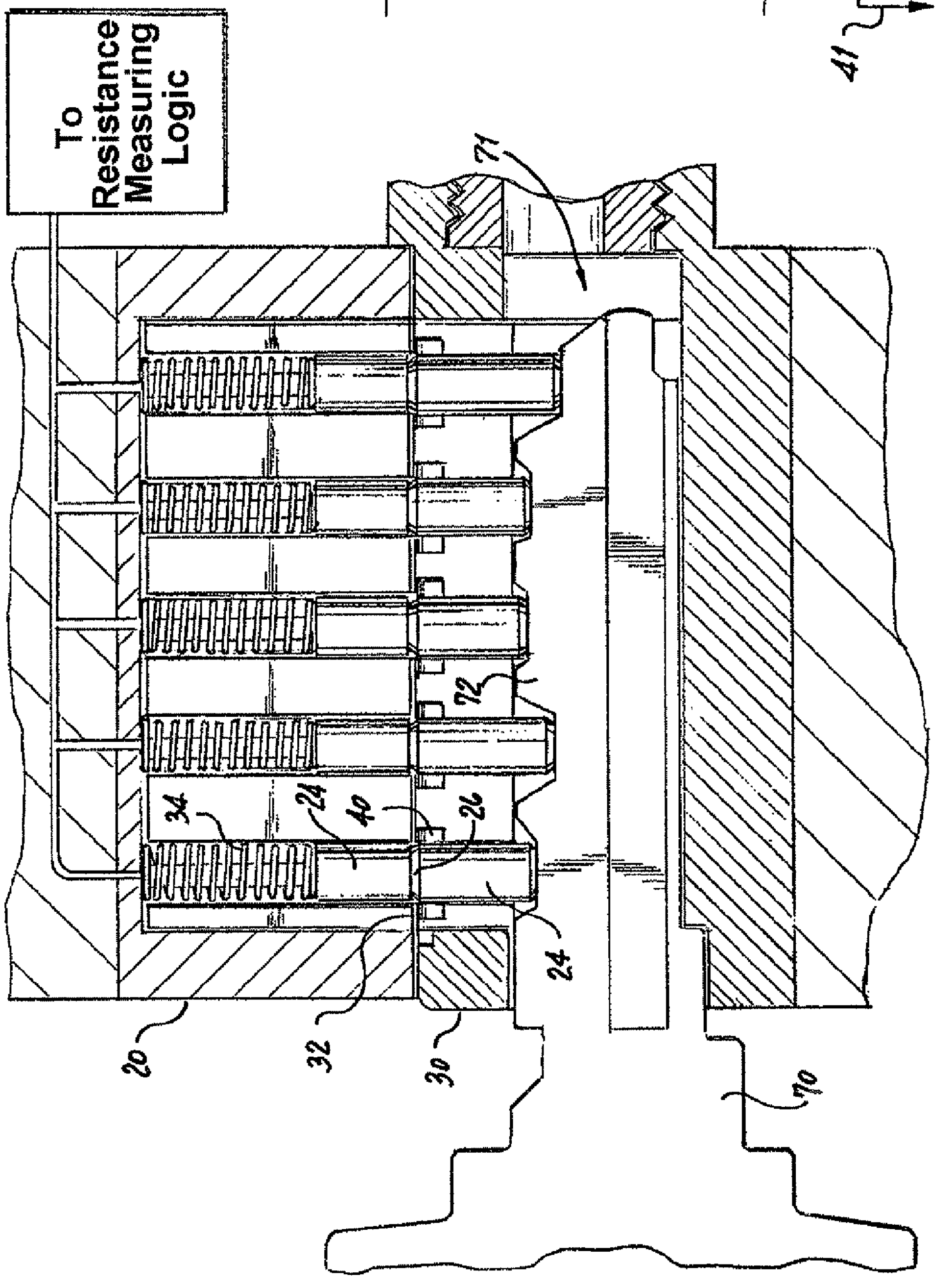
FIG. 3 is a perspective view of a lock using a measuring device for measuring resistance.

Referring to FIGS. 1-3, according to one embodiment of the present invention, a system 10 for controlling access to a secure area 15 defined by walls 14 includes an entryway embodied as a door 18. The door 18 includes a lock 20 having a locked and unlocked position for controlling access to the secure area 15 by locking against a door strike 16 which is a portion of the wall 14. The lock 20 includes pins 24 (FIG. 3) for locking and unlocking the lock 20. The lock 20 further includes predetermined pin positions for unlocking the lock 20. An electronic access device 22 communicates with the pins 24 for electrically measuring movement of the pins, Movement of the pins 24 is digitalized as a pin code determined for each pin. An unlock pin code is measured using predetermined pin positions for unlocking the lock 20. The electronic access device 22 also measures pin movement by a key 70. The key 70 includes teeth 72 which move the pins 24 in their respective cylinder housings 36, and the electronic access device 22 determines a key code for the key 70 from the pin movement. The access device 22 includes a microprocessor 23 for analyzing and determining measurement of the movement of the pins 24 and determining the pin code.

A control device 60 electrically communicates with the access device 22. The control device 60 includes a computer readable medium embodied as a data storage device 64 having a program 62 stored therein, and is connected to a processor 68. Using the program 62, the control device 60 identifies the key code received from the access device 22 and verifies the key code by determining whether the key code matches the unlock pin code for unlocking the lock to determine authentication of the key. Thereby, the control device 60 identifies and verifies or authenticates the key 70. The control device 60 also records entry into the secure area 15 using either card access or key entry. Further, the control device 60 identifies when the lock 20 is opened using an unidentified key, for example, a false or blank key used to compromise the lock. Additionally, the control device 60 generates an alarm or a signal 69, for example, using a transceiver 65, to communicate a security event, e.g., an unauthorized entry. The signal may be sent to a receiving entity such as authorized personnel or a remote monitoring station 69*a*. The security event is triggered when the key code does not match the unlock pin code for the predetermined position of the pins for unlocking the lock, and thus the key 70 is not authenticated.

An access interface embodied as a reader 50 communicates with the control device 60 and includes a microprocessor 54. A user provides identification to gain entry into the secure area 15 by presenting, for example, an access identification (ID) card (not shown) for swiping through the reader 50. The access device 50 includes the microprocessor (μP) 54 for reading the ID card and communicating with the control device 60. The access device 50 communicates with the control device 60 which analyzes and identifies the ID card.

Figure 4:
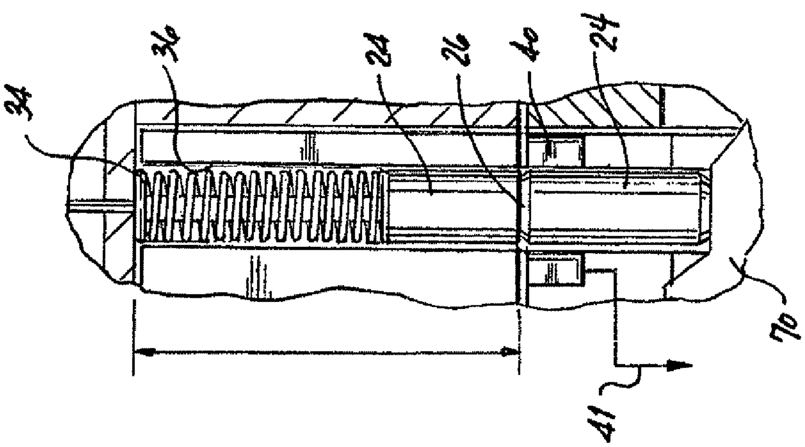
FIG. 4 is a detail perspective view of a pin, spring and cylinder housing shown in FIG. 3.

Referring to FIGS. 3 and 4, each of the pins 24 includes a shear point 26. The lock 20 includes an internal rotatable cylinder 30 defining a shear line 32 between the lock 20 and the rotatable cylinder 30. The lock 20 is opened by aligning the pin shear points 26 with the shear line 32 using the key 70 and rotating the cylinder 30. Springs 34 are positioned in cylinder housings 36 and mate with the top of each pin 24 for providing mechanical resistance to the pin moving upward in the cylinder housing 36.

In one embodiment of the invention, referring to FIGS. 3 and 4, resistance is measured on each pin 24 using a measuring device 40. The resistance increases as the pin 24 is pushed up upwards in the cylinder housing 36. The microprocessor 23 of the access device 22 processes the measurement of the pin 24 movement using the resistance measurement, and determines the key code from the pin movement. The key code is communicated 41 to the control device 60 for identifying and verifying the key and recording the entry into the secure area 15. Thus, the access control system 10 maintains accountability for any card holder or key holder entering through the door.

Figure 5:
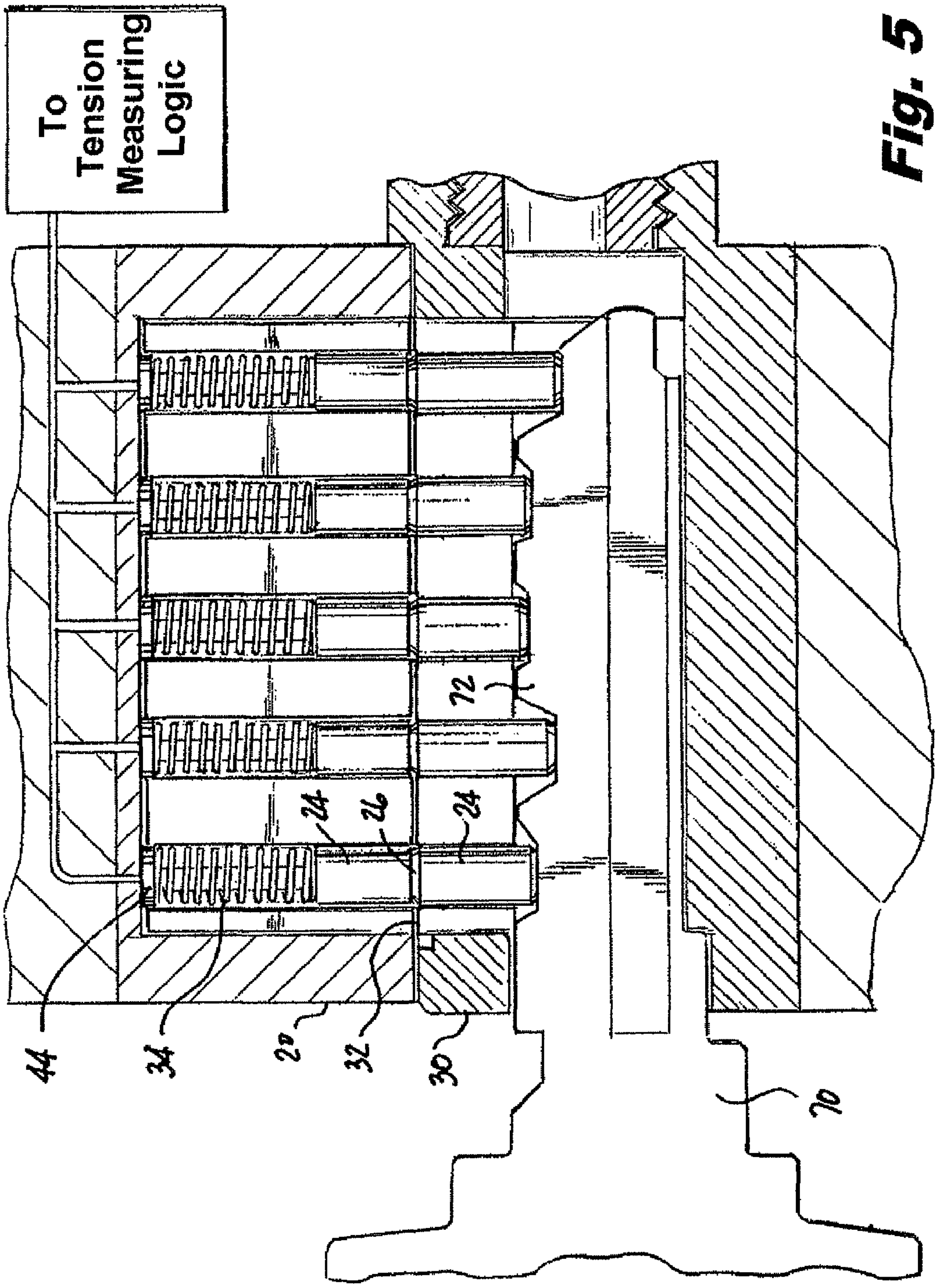
FIG. 5 is a perspective view of another embodiment of a lock according to the invention using a measuring device for measuring tension.

Referring to FIG. 5, in another embodiment of the invention, a measuring device 44 measures spring 34 tension on each pin 24. The measuring device 44 is inserted between the spring 34 and the cylinder housing 36. The tension reading increases as the pin 24 is pushed upwards in the cylinder housing 36. The tension reading is processed by the microprocessor 23 of the access device 22 to determine the measurement of the pin 24 movement and determine the key code from the pin 24 movement. As in the embodiment shown in FIGS. 3 and 4, the key code is communicated to the control device 60 for identifying the key and recording the entry into the secure area 15.

Figure 7:
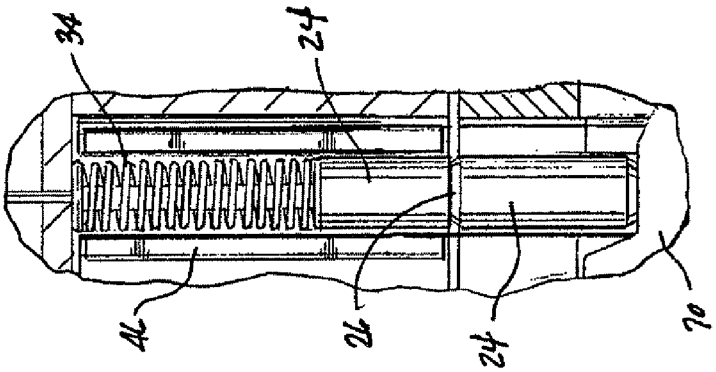
FIG. 7 is a detail perspective view of the cylinder housing and a measuring device shown in FIG. 6.
Figure 6:
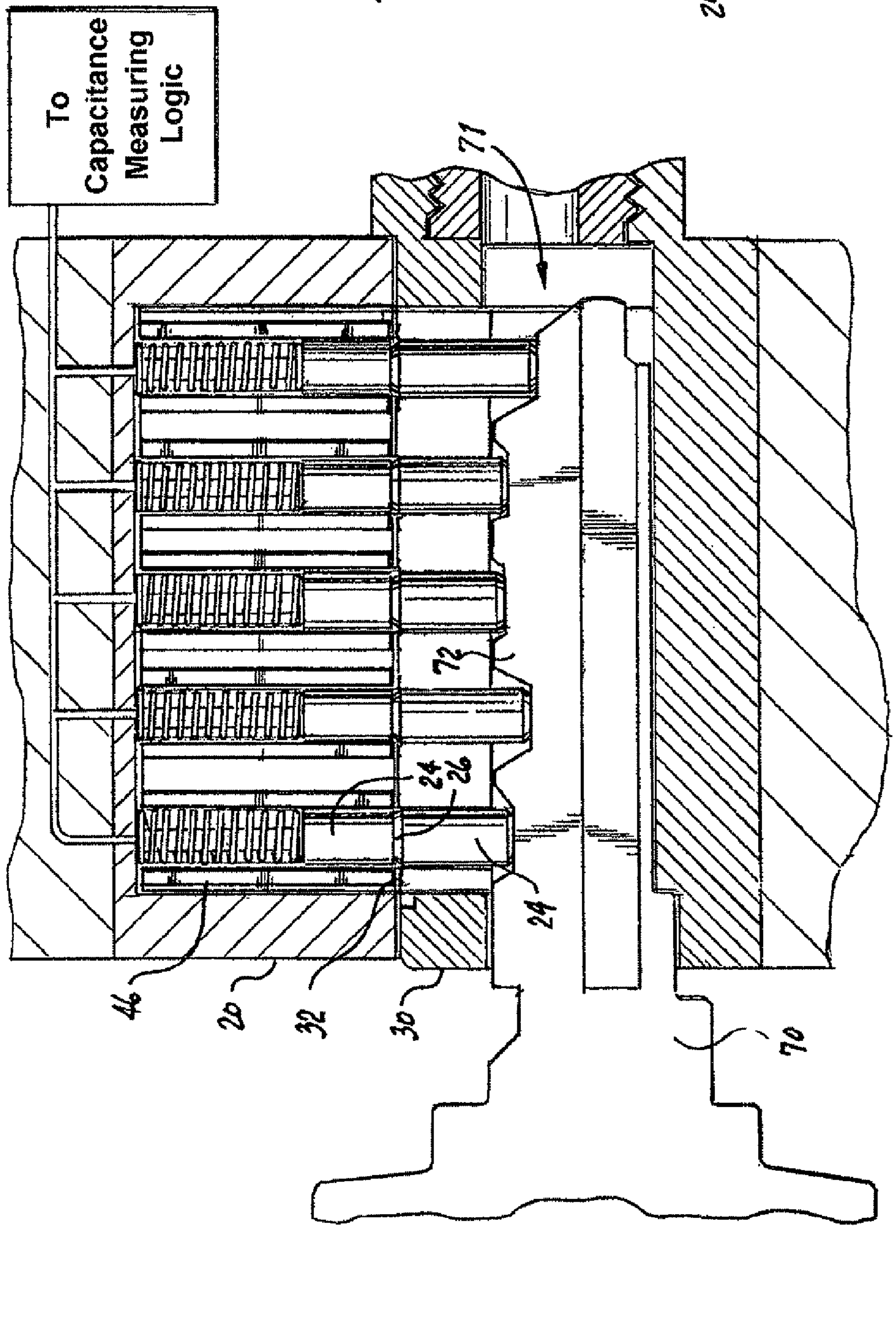
FIG. 6 is a perspective view of another embodiment of a lock according to the invention using a measuring device for measuring capacitance and inductance.

Referring to FIGS. 6 and 7, in another embodiment of the invention, capacitance is measured on each pin 24 using a measuring device 46. The capacitance increases as the pins 24 are pushed upwards into the cylinder housing 36. The capacitance reading is processed by the microprocessor 23 of the access device 22 to determine the measurement of the pin 24 movement and determine the key code from the pin movement.

In another embodiment, the measuring device 46 measures inductance for each pin 24. The inductance of each spring 34 is measured using the measuring device 46, which will be inversely proportional to the length of the spring 34. Thus, as the pin 24 is pushed upwards in the cylinder housing 36, the inductance increases. Similarly, the inductance reading is processed by the microprocessor 23 of the access device 22 to determine the measurement of the pin 24 movement and determine the key code from the pin movement.

Figure 8:
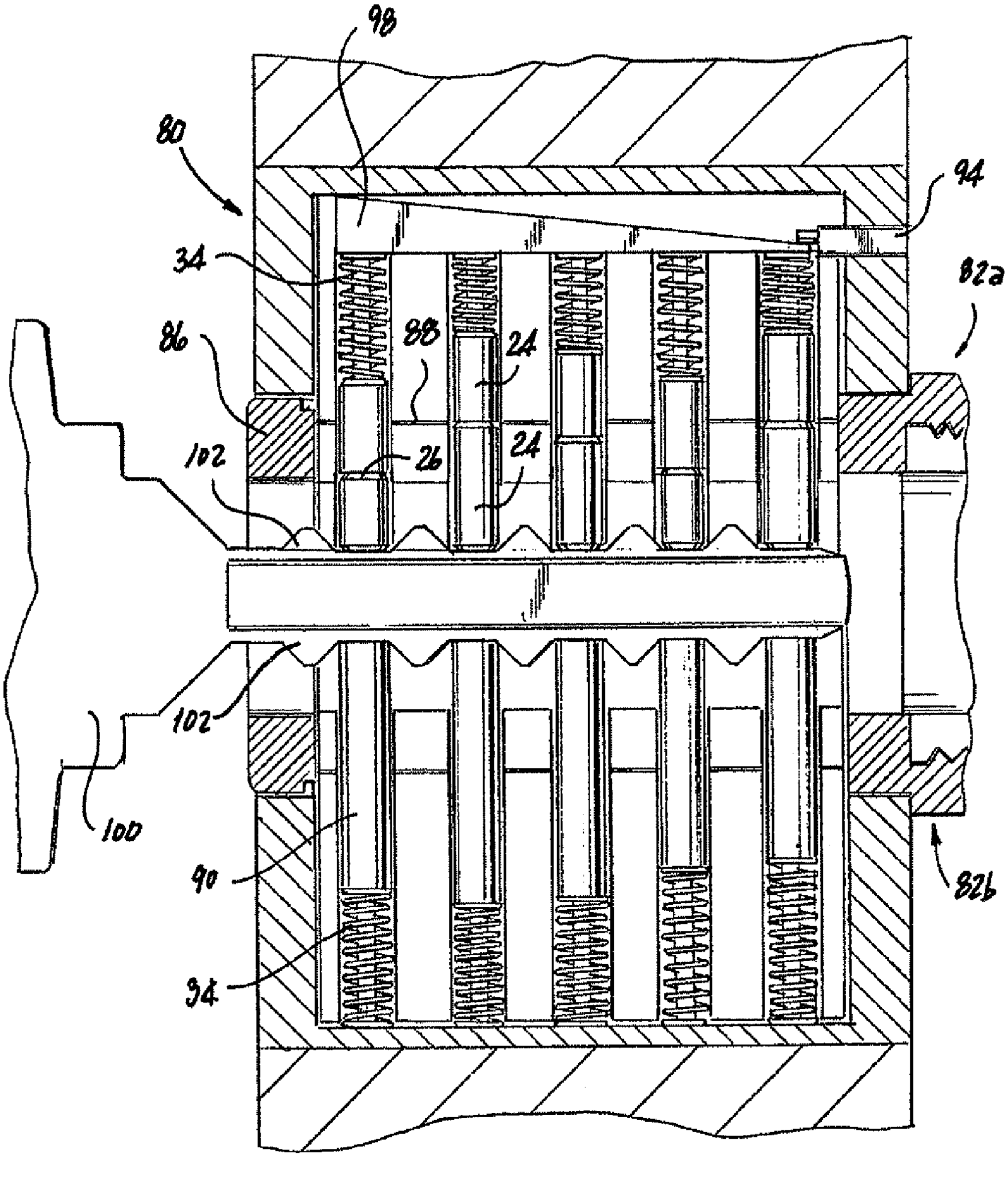
FIG. 8 is a perspective view of another embodiment of a lock according to the invention using an actuator and spring platform.
Figure 9A:
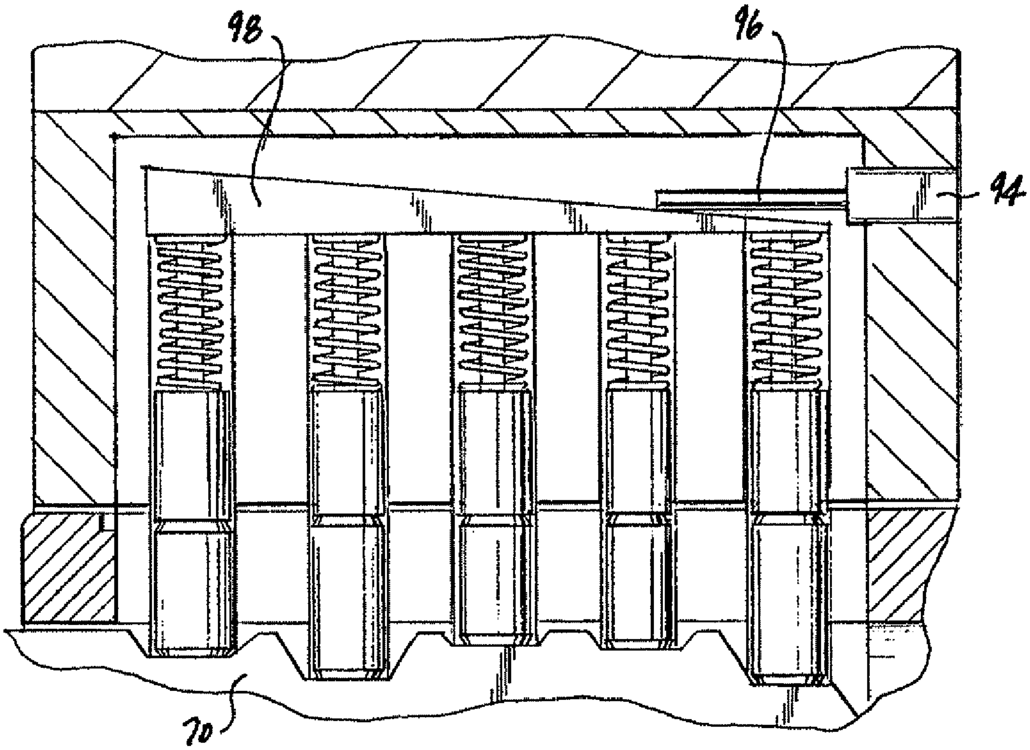
FIG. 9*a* is a detail block diagram of the spring platform and the actuator shown in FIG. 8 having a retracted rod.
Figure 9B:
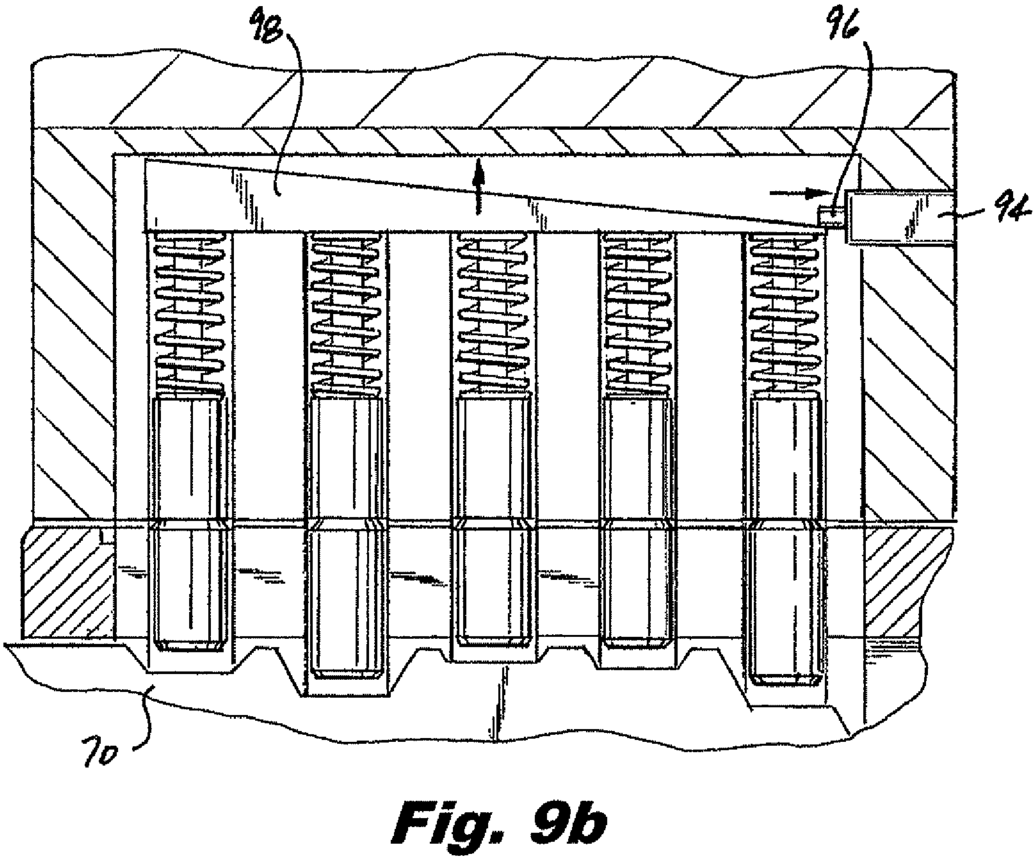
FIG. 9*b* is a detailed block diagram of the spring platform and actuator shown in FIG. 9*a* having the rod extended.

Referring to FIGS. 8, 9*a* and 9*b*, another embodiment of the invention includes a lock 82 including a cylinder 86 having an upper part 82*a* and a lower part 82*b*, where like elements to the lock 20 shown in FIGS. 1-6 have the same reference numerals. The lock 80 includes pins 24 with shear points 26 (or shear pins 24) in the upper part 82*a* of the cylinder 86, and solid pins 90 in the lower part 82*b* of the cylinder 86. The solid pins 90 are positioned in cylinder housings 92 which rotate with the cylinder 86 with a master key 100 which opens the lock 80. The master key 100 is double sided, i.e., has teeth 102 opposite one another. The solid pins 90 do not have a shear point as the pins 24 in the upper part 82*a* of the cylinder 86. The solid pins 90 movements in the cylinder housings 92 and measured to identify the master key 100. If the master key 100 key code or identification generated by the solid pins 90 matches an unlock pin code or authorized identification numbers, then the control device 60 unlocks the lock by moving the shear points 26 of the pins 24 in alignment with the shear line 88. In this embodiment, the pins 24 act as governing pins controlled by the control device 60. When the shear points 26 of the pins 24 and the shear line 88 are aligned, the cylinder 86 will turn and unlock the lock 80. Thus, a key code is generated from the master key 100 which is identified, recorded and verified by the control device 60.

Additionally, referring to FIGS. 9*a* and 9*b*, the shear pins 24 are mounted to a spring board 98 which is controlled by a solenoid or actuator 94 connected to the control device 60 for controlling the shear pins 24. The actuator 94 uses an extendable rod 96 to push the spring board 98 in the downward direction as shown in FIG. 9*a*, pushing the shear points 26 of the pins 24 below the shear line 88 and locking the lock 80. When the actuator 94 retracts the rod 96, the spring board 98 moves upward aligning the shear points 26 of the pins 24 with the shear line 88 of the lock 80 for unlocking the lock 80, as shown in FIG. 9*b*.

Figure 10:
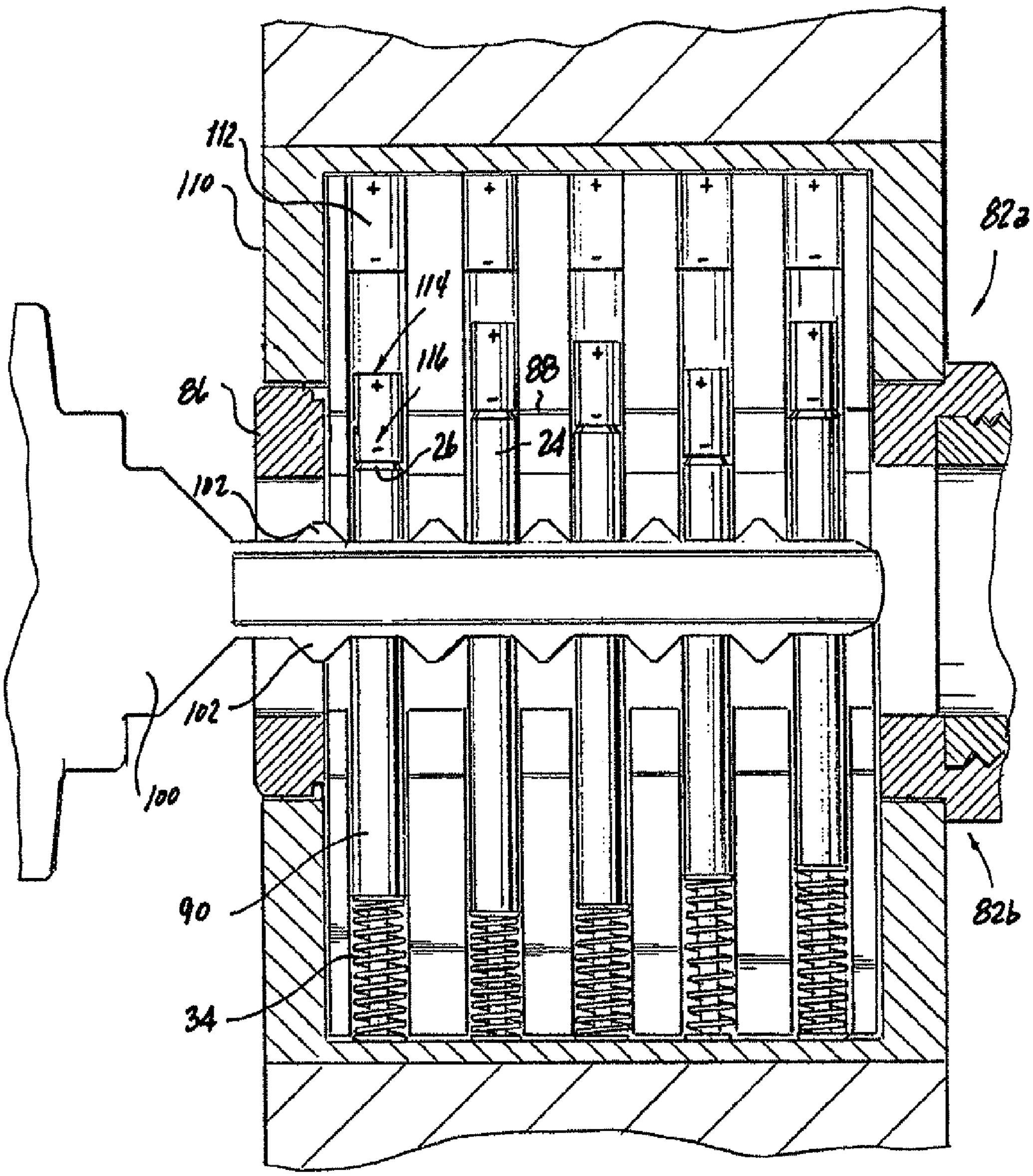
FIG. 10 is a perspective view of another embodiment of a lock according to the invention using magnets.

Referring to FIG. 10, another embodiment of the invention using a lock 110, including magnets 112 instead of springs 34, wherein like elements with the lock 80 shown in FIG. 8 have the same reference numerals. Each pin 24 is magnetically charged having a positively charged side 114 and a negatively charged side 116. The surrounding cylinder housing 36 is made of non-magnetic material. The pins 24 are pushed down when the magnets 112 are charged positively. In this state, the shear points 26 of the pins are below the shear line 88 and the lock 110 is locked. When the magnets 112 are charged negatively, the pins 24 are pulled upward so the shear points 26 align with the shear line 88 to unlock the lock 110.

Thereby, the present invention solves the problem of identifying a key in a lock, particularly in a duel access security system having electronic access and a lock, by measuring how the key presses or moves the pins in the lock. The movement is analyzed to determine an identification number associated with the measurement or key code, which is sent to the control device 60. The control device 60 records the event and may control additional pins, such as the solid pins 90 in FIGS. 8 and 10 in the lock 80, or lock 110. When the key code is acceptable or verified, the lock opens mechanically using the locks shear line 86. Using electrically controlled pins 24 as governing pins, the lock 80 or lock 110 for the door 18 may be programmed to accept keys having different identification numbers, and will not be limited to the key pattern that lines up pins along a shear point, because the control device 60 lines up the shear points 26 with the shear line 88.

Thereby, the embodiment of the present invention provide complete accountability of all entries into a secure area 15 through the door 18. Additionally, the lock is able to use more than one key to unlock the lock as the mechanical opening is controlled by the control device 60 in the embodiments shown in FIGS. 8 and 10. The key codes may be changed at the control device 60 which is a significant improvement in time efficiency and cost than changing the pins in a lock. The system and method of the present invention is also advantageous where a multiplicity of electronic access and mechanical locks coexists in a series, for example, on the same floor of a building, for example, as in U.S. patent application Ser. No. (11/782,557), incorporated by referenced hereinbefore.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A system for controlling access to a secure area, comprising:

a lock having a locked and unlocked position for controlling access to a secure area, the lock including pins for locking and unlocking the lock, the pins including a predetermined position for unlocking the lock;

an electronic access device communicating with the pins for electrically measuring movement of the pins and determining an unlock pin code for the predetermined position of the pins for unlocking the lock, the electronic access device electrically measuring pin movement by a key and determining a key code for the key from the pin movement; and a control device electrically communicating with the electronic access device, the control device identifying the key code and determining when the key code matches the unlock pin code to authenticate the key.

2. The system of claim 1, wherein the control device controls access to the secure area using an access interface proximal to the lock.

3. The system of claim 1, wherein the control device controls access to the secure area using at least one governing pin in the lock, the control device allowing access using the governing pin when the key code matches the unlock pin code and denying access using the governing pin when the key code does not match the unlock pin code.

4. The system of claim 3, wherein the pins each include shear points aligning with a cylinder shear line for unlocking the lock when the key code matches the unlock pin code.

5. The system of claim 3, wherein the pins are a first set of pins and the system further including:

a second set of pins in the lock, each pin of the second set of pins includes a shear point aligning with a cylinder shear line;

an actuator in the lock communicating with the second set of pins, the actuator being controlled by the control device for moving the second set of pins to align with the shear line for unlocking the lock when the key code matches the unlock pin code.

6. The system of claim 3, wherein multiple pin codes allow respective multiple key codes from respective keys to allow access using the control device.

7. The system of claim 1, wherein the pin movement is measured by a resistance measurement of a spring biasing the pin towards a key insertion passageway in the lock.

8. The system of claim 1, wherein the pin movement is measured by a tension measurement of a spring biasing the pin towards a key insertion passageway in the lock.

9. The system of claim 1, wherein the pin movement is measured using capacitance.

10. The system of claim 9, wherein the capacitance is measured by sensing increased capacitance when the pin is pushed into a cylinder in the lock by the key.

11. The system of claim 1, wherein the pin movement is measured using inductance.

12. The system of claim 11, wherein the inductance is measured by measuring the length of a spring biasing the pin towards a key insertion passageway in the lock.

13. The system of claim 1, wherein the control device determines a security event by determining when the key code matches the pin code.

14. The system of claim 13, wherein the control device generates a signal when the key code does not match the pin code.

15. A method for controlling access to a secure area, comprising:

controlling access to a secure area using a lock having a locked and unlocked position, the lock including pins for locking and unlocking the lock, the pins including a predetermined position for unlocking the lock;

electrically measuring movement of the pins using an electronic access device communicating with the pin;

determining an unlock pin code for the predetermined position of the pins for unlocking the lock;

measuring pin movement by a key using the electronic access device;

determining a key code for the key from the pin movement;

identifying the key code using a control device electrically communicating with the electronic access device; and determining when the key code matches the unlock pin code for authenticating the key using the control device.

16. A computer program product comprising a computer readable medium having recorded thereon a computer program for enabling a processor in a computer system to control access to a secure area, the computer program performing the steps of:

controlling access to a secure area using a lock having a locked and unlocked position, the lock including pins for locking and unlocking the lock, the pins including a predetermined position for unlocking the lock;

electrically measuring movement of the pins using an electronic access device communicating with the pin;

determining an unlock pin code for the predetermined position of the pins for unlocking the lock;

measuring pin movement by a key using the electronic access device;

determining a key code for the key from the pin movement;

identifying the key code using a control device electrically communicating with the electronic access device; and determining when the key code matches the unlock pin code for authenticating the key using the control device.

* * * * *